May 12, 1953
D. C. HEITSHU
2,638,045
AUXILIARY HYDRAULIC LOAD CONTROL AND ACTUATOR
FOR TRACTOR DRAWN IMPLEMENTS
Filed Feb. 15, 1946
2 Sheets—Sheet 1
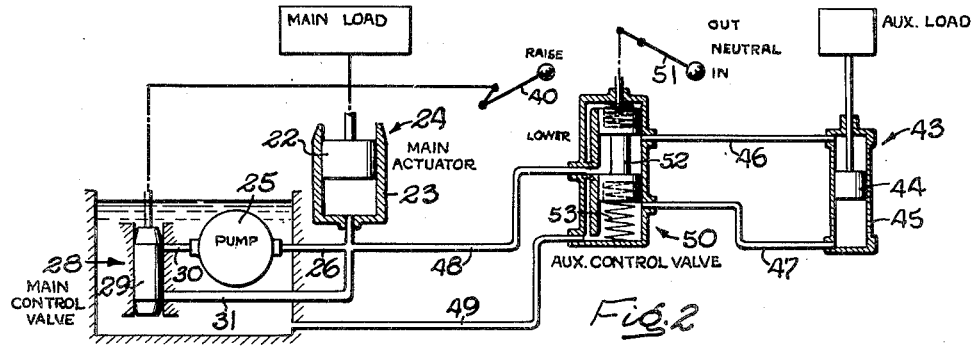
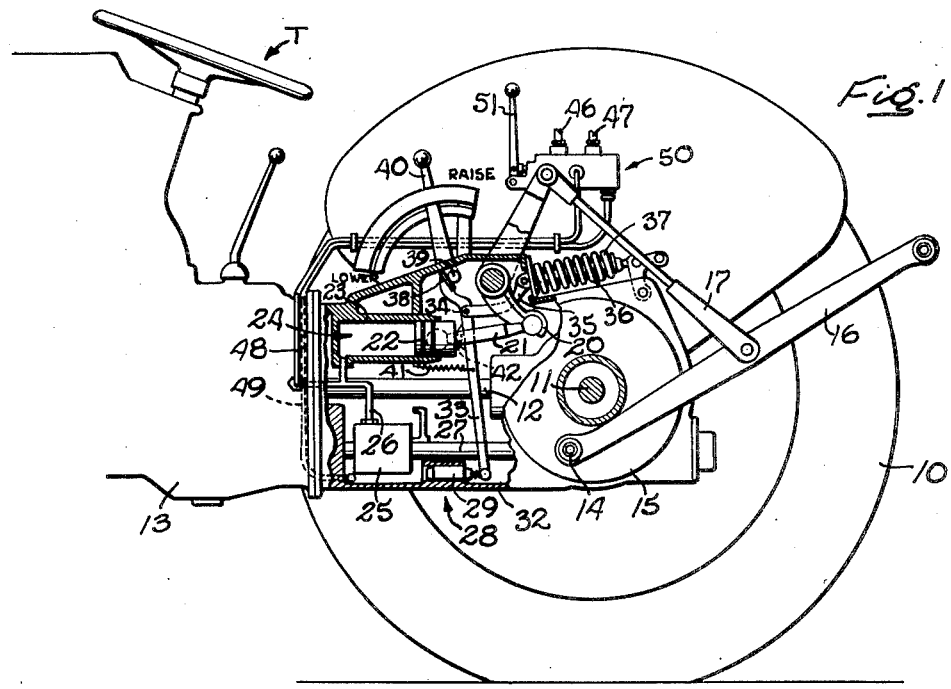
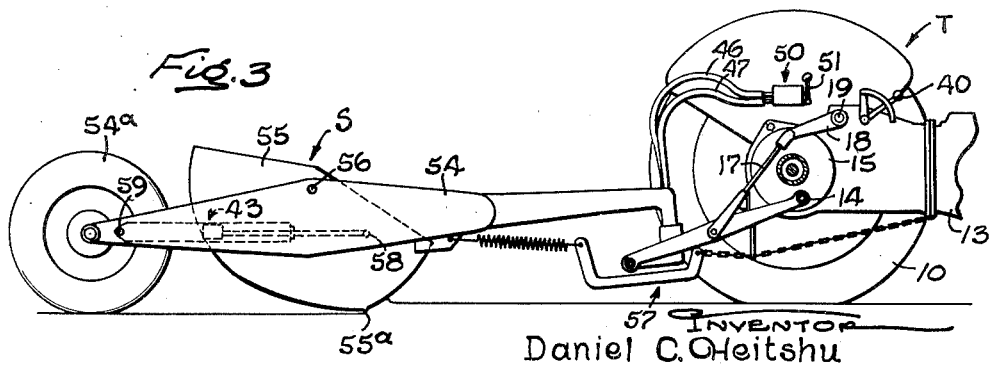
INVENTOR
Daniel C. Heitshu
By Carlson, Pitzner, Hubbard & Wolfe
ATTORNEYS

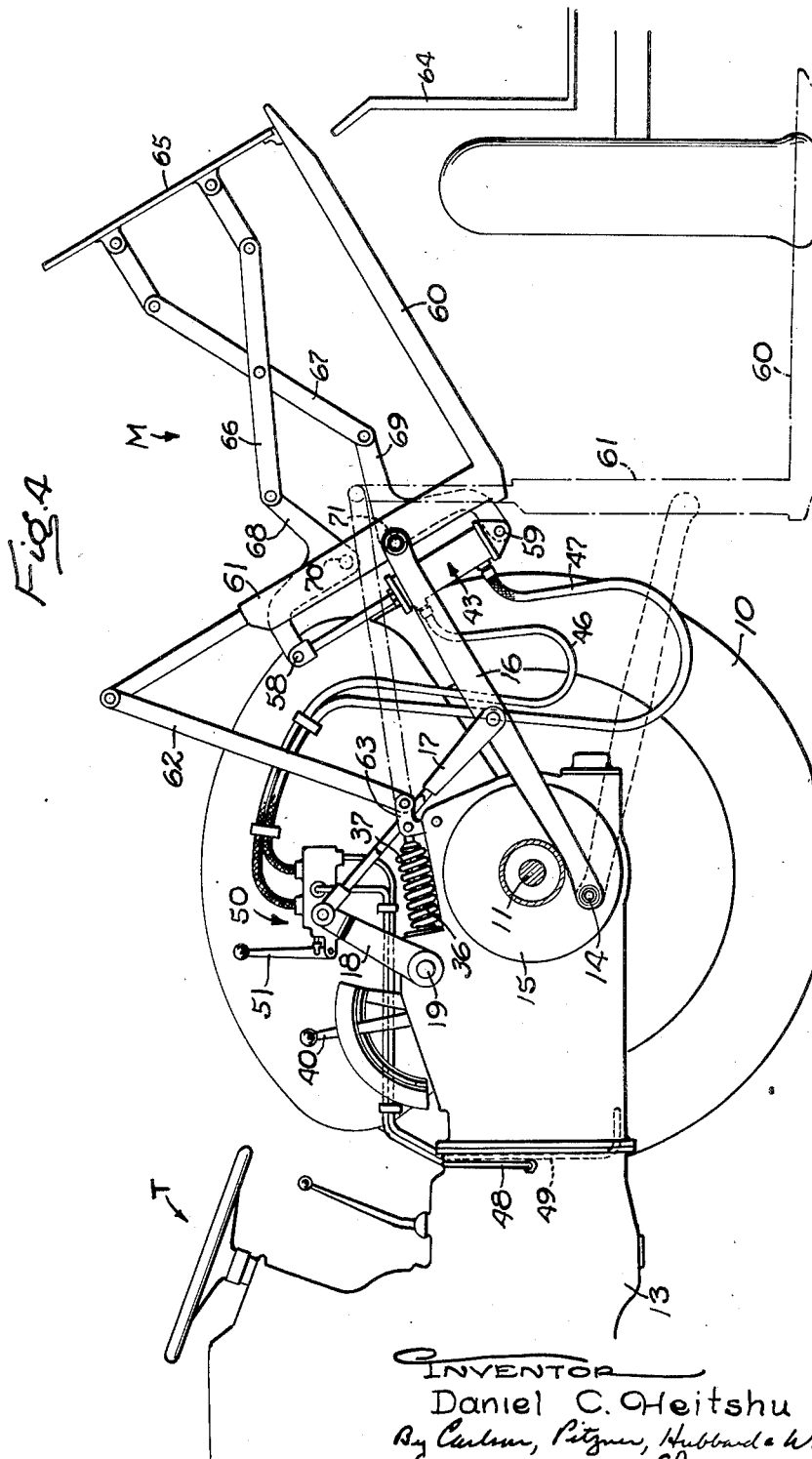

Patented May 12, 1953

2,638,045

UNITED STATES PATENT OFFICE 2,638,045

AUXILIARY HYDRAULIC LOAD CONTROL AND ACTUATOR FOR TRACTOR DRAWN IMPLEMENTS

Daniel C. Heitshu, Detroit, Mich., assignor to Harry Ferguson, Inc., Detroit, Mich., a corporation of Delaware Application February 15, 1946, Serial No. 647,714

3 Claims. (Cl. 97—46.27)

The present invention pertains to improvements in tractors for manipulating various implements, such, for example, as those used in agriculture, road building, and a variety of other purposes.

The general aim of the present invention is to provide a tractor having a mechanism for manipulating an attached implement with a maximum degree of versatility and yet which is relatively simple to construct, operate, and maintain.

More particularly, it is an object of the invention to provide a tractor equipped with not only a main hydraulic actuator for lifting and lowering an implement, but also an arrangement for utilizing the fluid pressurized in the system by the implement load sustained by the main actuator to operate an auxiliary actuator, as, for example, in shifting some movable element of the implement.

Further objects and advantages of the invention will become apparent as the following description proceeds, taken in connection with the accompanying drawings in which:

Figure 1 is a fragmentary side elevation of the rear portion of a tractor embodying the present invention, the near rear wheel being removed and the casing structure partially sectioned to expose the interior arrangement of parts.

Fig. 2 is a schematic layout of the hydraulic system for the tractor of Fig. 1.

Fig. 3 shows the tractor of Fig. 1 on somewhat reduced scale with a drag scraper attached.

Fig. 4 shows the tractor of Fig. 1 with a manure loader attached.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the tractor indicated at T in Fig. 1 has a pair of pneumatically tired rear wheels 10 carried by a rear axle 11 which is driven by an engine (not shown) through a propeller shaft 12 and a suitable transmission housed within the transmission casing 13. Universally pivoted at 14 on opposite sides of a differential housing 15 is a pair of laterally spaced draft links 16. These draft links are preferably fashioned in the form of heavy steel bars and their pivots 14 are desirably located forwardly of, and below, the rear axle 11.

The draft links 16 are arranged to be swung vertically for raising and lowering a detachably connected implement as will hereinafter appear by way of certain specific examples. The raising and lowering of the draft links is accomplished by means of a hydraulic apparatus powered from the tractor and incorporated in the same. Moreover, fluid from that same system is utilized herein to operate an auxiliary actuator and, as will appear in greater detail, the actuators are correlated with each other in such manner as to make use of the loading on the main actuator in pressurizing the fluid supplied to the auxiliary actuator.

In the particular construction illustrated, it will be observed, upon reference to Fig. 1, that the draft links 16 are sustained by drop links 17 from cranks 18 rigid with a transverse rock shaft 19. Also rigid with this shaft 19 is a depending arm 20 having a socket at its lower end to receive the ball end of a thrust link 21. The other or forward ball end of this thrust link is socketed in the outer end of a piston 22. Such piston is slidable in a cylinder 23 and coacts therewith to constitute the main actuator or hydraulic ram of the system, the actuator as a whole being designated as 24.

It will be perceived that, as the piston 22 is forced to the right by pressure fluid admitted to the cylinder 23, the thrust link 21 rocks the shaft 19 counterclockwise, thus elevating the draft links 16. Similarly, upon the exhaust of fluid from the cylinder 23, the weight of the draft links 16 and any load borne by them causes such links to lower by gravity, moving the piston into the exhausted cylinder.

Pressure fluid, such as oil, is supplied to the cylinder 23 from a pump 25 through a line 26. In the present instance, the pump 25 is arranged to be driven from a power take-off shaft 27 extending to the rear end of the tractor and which is itself driven through suitable connections (not shown) from the tractor engine.

The supply and exhaust of pressure fluid to the main hydraulic actuator 24 is controlled by a main control valve 28. Such control valve has a three-position plunger 29 which in both Figs. 1 and 2 is shown in its central or neutral position. When the plunger is moved downwardly from the position of Fig. 2, an intake passage 30 for the pump 25 is uncovered so that the pump begins delivering fluid by way of the line 26 into the main actuator 24. On the other hand, when the valve plunger 29 is moved upwardly from the position of Fig. 2, the pump intake 30 remains closed but a drain line 31 is opened, permitting fluid to exhaust from the main actuator into a suitable sump or reservoir. In the present instance, such sump is defined by a casing or housing 32 (see Fig. 1) interposed between the transmission and differential housings 13, 15 and within which the main actuator, pump and main control valve are housed.

A coordinated manual and automatic type of actuating mechanism is provided for the main control valve 28. For that purpose, the lower end of a floating lever 33 (Fig. 1) is pivoted to the projecting end of the valve plunger 29. Intermediate its ends but adjacent its upper portion, this floating lever 33 is pivoted at 34 on a thrust link 35 connected to a control rod 36 which is yieldably urged in an outward direction by a compression spring 37. At the upper end of the lever 33 is fixed an inclined pad 38 positioned to abut against an eccentric pin 39 on a shaft extending into the differential housing from the lower end portion of a rockable manual control or quadrant lever 40.

To lower the draft links 16 from their elevated position shown in Fig. 1, the quadrant lever 40 is swung downwardly. This causes the pin 39, which is eccentric to the pivotal axis of the lever 40, to press the pad 38 forwardly, thereby rocking the floating lever 33 counterclockwise about the pivot 34. Accordingly, the valve plunger 29 is shifted endwise away from its neutral position into its exhaust position and in which the drain line 31 is opened. In this way, fluid is permitted to drain from the main actuator 24 so that the draft links 16 descend by gravity. With the implements presently described, such descent of the draft links continues until the fluid is exhausted from cylinder 23 or the implement comes to rest on the ground. With some types of implements where automatic draft control is desired, a suitable linkage connection (not shown) may be employed for imparting a forward thrust to the rod 36 in accordance with the force reacting from the horizontal resistance imposed on the implement so that, as variations in such force occur, the floating lever 33 will be rocked about the eccentric pin 39 as a center to operate the main valve and keep the position of an implement in a desired working relation to the soil by raising or lowering the lower links and an implement mounted thereon. Such additional feature of automatic draft control may be used or not, just as desired, insofar as the present invention is concerned, and, accordingly, detailed consideration or illustration of the same is not necessary.

To raise the draft links 16 to the elevated position shown in Fig. 1, the hand control lever 40 is pulled upwardly to the position there shown. This tends to move the eccentric pin 39 away from the pad 38 so that a tension spring 41 applied to the floating lever 33 is free to swing the latter clockwise, thus shifting the main valve plunger 29 to its fluid supply position. As heretofore noted, when the plunger is in the latter position, the pump intake 30 is uncovered and the exhaust connection 31 blocked so that fluid is pumped into the main actuator cylinder 23 and thrusts the piston 22 to the right, lifting the draft links 16. When the draft links reach their fully elevated position, the travel of the piston 22 outwardly of the cylinder 23 is such that its outer edge engages laterally projecting bosses 42 on the floating lever 33, thereby to shift the lever automatically in a counterclockwise direction through a sufficient distance to restore the valve plunger 29 to neutral. In the event of any loss of fluid from the main actuator 24, the piston 22 will move into the cylinder 23, thus tending to release the lever 33 to the pull of spring 41 so that the valve plunger 29 is shifted to its fluid supply position. In this way, the main actuator cylinder is maintained filled with fluid at all times, the main valve plunger shifting out of neutral into fluid supply position intermittently as may be required to replenish the supply of fluid.

It is also to be observed that the weight of any implement sustained by the draft links 16 is borne largely by the body of fluid within the main actuator cylinder 23. The load is imposed on the body of fluid trapped in the cylinder by the weight of the draft links themselves and by any load on them, such loads thus serving to maintain the fluid under pressure. In other words, the load borne by the draft links maintains the fluid in the system "pressurized."

Power for auxiliary purposes, such, for example, as shifting an element of an implement, is applied by means of a double acting auxiliary actuator, here designated generally as 43, and being shown in this instance as comprising a piston 44 slidable in a cylinder 45 (see Fig. 2). Lines 46, 47 leading to opposite ends of this cylinder 45 are connected automatically to pressure and exhaust lines 48, 49 by an auxiliary control or reversing valve 50. The latter valve has a manual operating handle 51 and is desirably situated for the convenience of the operator adjacent the quadrant lever 40 (see Figs. 1 and 3). The valve 50 comprises a sliding spool type plunger 52 normally held in its central or neutral position by centering springs 53. When the plunger is shifted to its "in" position shown in Fig. 2, the valve ports cause pressure fluid to be supplied through the line 46 to the rod end of the actuator 43 and exhausted from the opposite end, whereas when the valve is shifted to its opposite or "out" position, the valve port connections are reversed so that fluid is exhausted from the rod end of the actuator and supplied to the opposite end.

It is to be particularly noted that, although the exhaust line 49 leads directly back to the sump, the pressure or supply line 48 for the auxiliary actuator is connected to the line 26 between the pump outlet and main ram intake. The system is peculiar in that the line 26, and hence the line 48 connected to it, is itself sometimes exhausted as well as sometimes supplied with fluid from the pump, and at still other times fluid is locked in it, all depending upon the position of the main valve 28. Nevertheless, the main and auxiliary actuators are correlated in the system in a unique manner such that each may perform its intended functions without interference with the other, but rather, in aid of each other. This will be better appreciated by reference to the more detailed analysis of operation which follows in connection with the description of the specific implement shown.

Of the illustrated exemplary uses of the tractor T, it will be seen upon reference to Fig. 3 that it is there shown as pulling a dig and carry type scraper S. This implement comprises a main frame 54 having laterally spaced side portions between which is pivoted a scraper bowl 55 on pivots 56. The rear end of the frame 54 is supported by a pair of ground wheels 54a, while the front end has a gooseneck connection with a transverse draw bar (not shown) extending between the trailing ends of the main draft links 16. For present purposes we need not be concerned either with the specific form of connection between the implement and tractor or the stabilizer mechanism indicated generally at 57, and, accordingly, detailing of the same is unnecessary. For the present, suffice it to say that as the tractor T moves forward, draft load is applied from the implement to the main draft links 16 and that, upon raising of these links, the front end of the scraper is swung up into elevated or transport position while, upon lowering of the draft links, the front end of the implement moves down into the working position shown in Fig. 3.

As indicated in Fig. 3, the auxiliary actuator 43 may be positioned as shown on the implement S for operating the bowl 55. For that purpose the free end of the piston rod may be pivotally connected at 58 to the bowl and the opposite end of the cylinder pivotally connected at 59 to the frame. The lines 46, 47 leading to the auxiliary actuator 43 are desirably flexible conduits or hoses so that they do not interfere with movement of the implement nor with positioning of the actuator. The auxiliary actuator may be installed as a more or less permanent part of the implement, and the lines 46, 47 to it disconnected when the implement is unhitched. On the other hand, the actuator 43 may be removed with the lines intact by removing the pivot pins at 58, 59 when the implement is unhitched. The latter procedure has the advantage that it does not entail the necessity of unfastening pressure couplings nor permitting air to enter the auxiliary lines 46, 47.

The pivotal connections 58, 59 for the auxiliary actuator 43 are so located that the bowl 55 will occupy its digging position shown in Fig. 3 when the piston 44 is approximately halfway along its path of travel. By shifting the piston rightwardly (as viewed in Fig. 3) or, in other words, in an "out" direction, the bowl 55 is rocked into an upright or carrying position. Similarly, when the piston is forced leftwardly to its "in" position, the bowl 55 is rocked into full dumping position.

Considering the operation of the installation shown in Fig. 3 in somewhat more detail, let us assume initially that the parts are located as there shown. In other words, the draft links 16 are in their lowered position, and the piston 44 of the auxiliary actuator 43 is approximately midway of its path of travel so that the scraper bowl 55 is inclined for digging. In such case, the auxiliary valve 50 will be permitted to remain spring-centered in its neutral position so that fluid is locked in the lines 46, 47 to retain the bowl 55 in digging position. Moreover, the quadrant lever 40 will be in its forward or "lower" position so that the main valve 28 exhausts the main ram or actuator 24 and no substantial pressure exists in the lines 26, 48. As the tractor T is driven forward, the digging edge 55a of the bowl 55 scoops earth which rolls back into the bowl.

After the scraper bowl 55 is loaded with earth, the operator next rocks it forwardly into its generally upright or carrying position. For that purpose, he shifts the auxiliary valve 50 to its "out" position and also shifts the quadrant lever 40 in its upper or "raise" position. It will be perceived that manipulation of the quadrant lever is at this point necessary since otherwise simply shifting the auxiliary valve 50 would not serve to effect any supply of pressure fluid to the auxiliary actuator. The latter is true since, under the conditions assumed, the lines 26, 48 have been connected to drain. Shift of the quadrant lever, as noted, serves, however, to block their drain connection and open the intake of the pump 25 so that the latter delivers fluid into the lines 26, 48. As a consequence of this fluid delivery, the pistons of both of the parallel connected actuators 43 tend to move. Actually, however, the movement of the auxiliary actuator piston will take place first since the auxiliary actuator is always more lightly loaded than the main actuator. While such delivery of fluid to the auxiliary actuator is taking place, the fluid so delivered is maintained under pressure by the weight of the implement applied to the main actuator or ram 24 via the draft links 16, drop links 17, and remaining connections to the ram. In this manner the scraper bowl 55 is quickly and easily tilted upwardly to its carrying position.

If the operator desires, he may, at the completion of the rocking of the scraper bowl into carrying position, not only permit the auxiliary valve 50 to return to its blocking neutral position, but may also restore the quadrant lever 40 to its lowered position so that the draft links 16 will remain lowered. On the other hand, if he desires, he may simply let the quadrant lever 40 remain in its upper or "raise" position. The result will be that, at the completion of the travel of the auxiliary actuator piston, its further motion will be blocked and, accordingly, fluid will thereafter flow from the pump into the main actuator rather than into the auxiliary actuator. There will thus be a rocking of the scraper bowl 55 into carrying position and then a lifting of the front end of the frame 54 into transport position, all in proper and automatically accomplished sequence.

The draft links 16 will remain elevated so long as the quadrant lever 40 is in its "raise" position. If there is any leakage of fluid, the resultant tendency of the main actuator piston 22 to move into its cylinder 23 will free the floating lever 33 and cause the main valve 28 to shift automatically for replenishment of the fluid in the system as may be required. Moreover, the fluid in the system on the outlet side of the pump 25 is maintained continuously under pressure by the load of the draft links and implement on the main actuator. Under such conditions, if the operator wishes to dump the elevated scraper bowl 55, he has only to shift the auxiliary valve 50 to its "in" position. Pressure fluid thereupon flows from the line 46 to the rod end of the cylinder 45 so that the bowl is rocked rearwardly to dumping position. The resultant withdrawal of fluid from the line 48 causes the pressure therein to tend to drop so that there is some movement of the main piston 22 and which is at least sufficient to cause the main valve 28 to open for automatic replenishment of the supply of fluid in the line 48. The draft links 16 tend to sink while the scraper bowl is being moved, but at the completion of its movement they are quickly and automatically restored to their fully elevated position.

The usual next step in manipulation of the implement is for the operator to shift the auxiliary valve 50 to its "out" position for a sufficient interval for the bowl 55 to be rocked to its digging position and then return the auxiliary valve to neutral. Again, the line 48 is automatically maintained flooded with pressure fluid since the quandrant lever 40 is still in its "raise" position. To lower the implement into its working position shown in Fig. 3, after having thus restored the bowl to its proper angle, the operator has only to shift the quadrant lever 40 into its "lower" position whereupon the main ram lowers the draft links 16 by exhausting fluid from the main actuator 24 as heretofore described.

In the preceding description of operation, we have considered particularly the cases in which the draft links 16 are fully elevated and completely lowered. Aside from these two normal positions, it should also be borne in mind that it is possible to juggle the main valve 28 into neutral position by means of the quadrant lever 40 when the draft links 16 are in some intermediate or partially raised position. If, under such circumstances, the auxiliary valve 50 is opened, fluid will be expelled through the line 48 into the auxiliary actuator by the load on the main actuator. Pressure fluid is thus available for operating the auxiliary actuator. There is not, however, any automatic replenishment of the fluid, as is the case when the links 16 are fully raised, and as fluid passes to the auxiliary actuator the draft links will sink toward their lowered position. The operator is thus apprised of the fact that he must shift the quadrant lever 40 to its "raise" position to furnish additional fluid for completing the movement of the auxiliary actuator if such movement has not already been completed.

Fig. 4 illustrates another of the many types of implements which may be applied to tractors embodying the present invention. In this instance, the impletment M is a manure loader. It comprises a wide generally horizontal blade or series of forked teeth 60 which projects rearwardly from, and is rigid with, an upright frame or backboard 61. The frame 61 is located between, and detachably connected to, the trailing ends of the main draft links 16. Simply for stabilization purposes, a top link 62 is pivoted between the upper end of the frame 61 and a control shackle 63 connected to the plunger 36 and which serves as a convenient point of attachment.

The blade 60 is loaded by lowering it into the horizontal position shown in broken lines in Fig. 4 and then backing the tractor so that the blade is shoved under a pile of manure. The loaded blade may then be elevated by the draft links 16 and the load transported to some desired point of discharge.

In some instances it may be desirable to discharge the load of manure into an elevated container, such as the wagon box indicated fragmentarily at 64 in Fig. 4. For that purpose, a pusher panel 65 is provided, the same being arranged for actuation by the auxiliary actuator 43 through the medium of a lazy tongs or X-type linkage 66, 67. As the piston rod moves into the cylinder of the auxiliary actuator, the crossed links 66, 67 are scissored toward each other, thereby thrusting the panel 65 outwardly of the blade 60 to push the load off the same into the wagon. Conversely, when the auxiliary piston is moved in an "out" direction, the links are scissored away from each other, withdrawing the panel 65 toward the frame 61.

The auxiliary actuator 43 is again connected by removable pivot pins 58, 59, in this instance to the ends of a pair of bell cranks 68, 69 pivoted at 70, 71 on the frame 61 and having their opposite ends pivoted to respective ones of the crossed links. As before, the hydraulics may be disconnected from the implement intact by removing the pins 58, 59 when unhitching the implement from the tractor.

The details of operation of the hydraulics when using the implement M substantially match those for the dig and carry scraper S previously described, and, accordingly, repetition appears to be unnecessary. Suffice it to say that whenever the implement M is raised, as shown in full lines in Fig. 4, an automatically replenished supply of pressure fluid is always available for operation of the auxiliary actuator 43 and is maintained under pressure by the load of the raised implement and draft links. Moreover, when the implement is lowered and the operator desires to operate the auxiliary hydraulic actuator, he has only to shift the auxiliary valve handle 51 and move the quadrant lever 40 to its "raise" position, whereupon the auxiliary actuator will complete its movement prior to raising of the main draft links 16 and the latter can be avoided entirely, if desired, by restoring the quadrant lever to its "lower" position immediately at the end of the desired auxiliary actuator movement.

From the foregoing, it will be perceived that a tractor has been provided embodying correlated hydraulic and hitch mechanisms which is simple, both from the standpoint of construction and manipulation. By the paralleling of the actuators in the unique manner described, however, the functioning of the control valves 28 and 50 is interrelated so as to achieve a high degree of versatility of operation and one in which full advantage is taken of the loading of the main actuator by the hitch for furnishing fluid under pressure to the auxiliary actuator.

I claim as my invention:

1. In an apparatus for manipulating an implement having a movable control element thereon, the combination of a tractor, an hydraulic ram thereon, a connecting linkage on said tractor for connection to said implement and so arranged that the weight of the implement is applied to said ram, an hydraulic supply line for supplying fluid under pressure to said ram to cause raising of the linkage and connected implement, a manually controlled main valve for controlling admission of pressure fluid to said supply line, a drain line, an hydraulic actuator connected to the movable control element on the implement for movement independently of said ram and associated linkage, an actuator control valve connected to the actuator, said control valve having ports and having a manual selector for selectively moving the valve into a first position in which the ports connect the actuator to the hydraulic supply line, a second position in which the ports connect the actuator to the drain line, and a third position in which the ports are closed thereby blocking fluid flow to and from the actuator for positively positioning the movable control element connected to said actuator.

2. In an apparatus for manipulating an implement having a movable control element thereon, the combination of a tractor, an hydraulic ram thereon, a connecting linkage on said tractor for connection to said implement and so arranged that the weight of the implement is applied to said ram, an hydraulic supply line for supplying fluid under pressure to said ram to cause raising of the linkage and connected implement, a manually controlled main valve for controlling admission of pressure fluid to said supply line, a drain line, a double acting piston and cylinder type hydraulic actuator connected to the movable control element on the implement, an actuator valve so arranged as to connect the alternative ends of said double acting actuator to said supply line and the remaining end to the drain line so that the piston in said actuator may be caused to move from one to the other of its extreme positions under the influence of pressure in said supply line and independently of movements of said ram, and means for replenishing the fluid consumed in the movements of said piston, said replenishing means including an operator for admitting additional pressure fluid to said supply line automatically as an incident to a decrease in the volume of fluid in said ram.

3. For use with a tractor having a draft linkage for connection to an implement and having a ram together with a main control valve for alternatively connecting the ram to a source of pressure fluid and to drain for respective raising and lowering of the linkage together with an implement having a movable control element thereon, the combination comprising an hydraulic actuator arranged for connection to the movable control element on the implement for movement independently of said ram and associated linkage, an actuator control valve connected to the actuator, said control valve having a connection to the source of pressure in said tractor, said control valve having a manual selector and having ports so arranged that (1) the actuator is connected to the source of pressure fluid when the selector is in a first position, (2) the actuator is connected to drain when the selector is in a second position and (3) the actuator is blocked against fluid flow for positively positioning the movable control element connected thereto when the selector is in a third position.

DANIEL C. HEITSHU.

References Cited in the file of this patent

UNITED STATES PATENTS

| Number | Name | Date |
|---|---|---|
| 2,118,181 | Ferguson | May 24, 1938 |
| 2,311,639 | Click | Feb. 23, 1943 |
| 2,347,898 | Ferguson | May 2, 1944 |
| 2,349,257 | Evans et al. | May 23, 1944 |
| 2,386,192 | Brimhall | Oct. 9, 1945 |
| 2,430,597 | Acton | Nov. 11, 1947 |
| 2,445,260 | Brimhall | July 13, 1948 |